United States Patent
Lee et al.

(10) Patent No.: US 7,083,738 B2
(45) Date of Patent: Aug. 1, 2006

(54) METHOD FOR CREATING INDUCTIVE WRITE HEAD WITH STEEP SHOULDER AT NOTCH

(75) Inventors: Edward Hin Pong Lee, San Jose, CA (US); Aron Pentek, San Jose, CA (US); Wen-Chien David Hsiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 138 days.

(21) Appl. No.: 10/632,631

(22) Filed: Jul. 31, 2003

(65) Prior Publication Data
US 2005/0023243 A1 Feb. 3, 2005

(51) Int. Cl.
*B29D 11/00* (2006.01)
*H01L 21/00* (2006.01)

(52) U.S. Cl. ............................................. 216/24; 438/3
(58) Field of Classification Search ................... 216/22; 438/3; 338/32 R; 29/602.1–603.27; 360/119, 360/120, 126
See application file for complete search history.

(56) References Cited

U.S. PATENT DOCUMENTS 6,119,331 A * 9/2000 Chang et al. ............. 29/603.14
2001/0055879 A1 * 12/2001 Sasaki ........................ 438/689

* cited by examiner

*Primary Examiner*—Parviz Hassanzadeh
*Assistant Examiner*—Roberts Culbert
(74) *Attorney, Agent, or Firm*—Zilka-Kotab, PC

(57) ABSTRACT

A method for fabricating a magnetic head using a modified P1 cap process. A first pole is formed. A cap is formed above the first pole. A gap layer is formed above the cap. A second pole is formed above the gap layer. Exposed portions of the gap layer are removed. The cap and first pole are milled for creating a shoulder of the first pole tapered upwardly towards the cap. Another method for fabricating a magnetic head includes forming a first pole, forming a gap layer above the first pole, forming a second pole above the gap layer, forming a layer of photoresist above the second pole, patterning the photoresist such that the photoresist covers areas of the gap layer positioned towards the second pole, removing exposed portions of the gap layer, removing part of exposed portions of the first pole for forming steps in the first pole on opposite sides of the photoresist, removing the photoresist, and milling for creating a shoulder of the first pole tapering upwardly towards the cap.

13 Claims, 8 Drawing Sheets

METHOD FOR CREATING INDUCTIVE WRITE HEAD WITH STEEP SHOULDER AT NOTCH

FIELD OF THE INVENTION

The present invention relates to magnetic heads, and more particularly, this invention relates to a method for forming a write head having a steep shoulder notch.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces using recording heads. Read heads are then used to read data from the tracks on the disk surfaces. Read and write heads can be formed together on a single slider.

FIG. 1 illustrates the air bearing surface (ABS) view of a typical inductive write head 100. In a typical head, an inductive write head includes a coil layer (not shown) embedded in an insulation stack (not shown) that may have first, second and third insulation layers, the insulation stack being located between first and second pole piece layers 102, 104. A gap is formed between the first and second pole piece layers 102, 104 by a gap layer 106 at an air bearing surface of the write head. The pole piece layers are connected at a back gap. Currents are conducted through the coil layer, which produce magnetic fields in the pole pieces 102, 104. The magnetic fields fringe across the gap at the ABS for the purpose of writing bits of magnetic field information in tracks on moving media, such as in circular tracks on a rotating magnetic disk or longitudinal tracks on a moving magnetic tape.

As head sizes become smaller, the flux 108 produced by the pole piece layers 102, 104 can create a fringing field that causes adjacent track interference that can overwrite and/or realign data bits in adjacent tracks. Fringing fields are reduced somewhat by forming a notch 110 in the first pole piece layer 102. However, if the notch 110 is made too large, the flux necessary to write to the data is choked.

It has been found that producing an angled "shoulder" 202 in the first pole piece layer 102 below a straight portion 204 of the first pole piece layer 102, such as in the head 200 shown in FIG. 2, form a steep shoulder notch that minimizes fringing fields while increase the on track writing field. This enables better on track writability while reduces the adjacent track interference. Note the difference in flux patterns 108 in FIGS. 1 and 2. It has also been found that this design also increases overwrite, i.e., the field that overwrites data on the media. Further, flux leakage is reduced, concentrating the field at the ABS.

Prior art methods proposed for creating a steep shoulder notch such as that shown in FIG. 2 require either an additional photo layer or cause degrading of the pole width and reduced pole shape control capabilities. The additional photo layer adds to the cost of manufacture. Degradation of the pole width and/or pole shape reduces performance of the head. Thus, both of these options are undesirable.

What is therefore needed is a way to form the desired tapered shoulder without use of an additional photo layer.

What is also needed is a way to form the desired tapered shoulder that does not affect the track width and pole shape control.

SUMMARY OF THE INVENTION

The present invention overcomes the drawbacks and limitations described above by providing a method for fabricating a magnetic head using a modified P1 cap process to achieve the desired notched shape without the need to introduce additional photo steps. The P1 cap is a high moment magnetic layer inserted between the P1 pole and the write gap layer.

According to the method, a first pole is formed. A cap is formed above the first pole. Opposite side regions of the cap are removed if the cap covers the entire first pole. The side regions are filled with a material selected from a group consisting of a dielectric, a material susceptible to removal by reactive ion etching, and a material susceptible to removal by milling. A gap layer is formed above the cap. A second pole is formed above the gap layer. Exposed portions of the gap layer are removed. The material used to refill the side regions is also removed, thereby exposing peripheral regions of the cap. The cap and first pole are milled for creating a shoulder of the first pole tapered upwardly towards the cap.

Preferably, side edges of the second pole, gap layer, and cap are substantially vertically aligned after the milling. Exposed portions of the gap layer can be removed by reactive ion etching. The gap layer can be a dielectric or a nonmagnetic metal.

A method for fabricating a magnetic head according to another embodiment includes forming a first pole, forming a gap layer above the first pole, forming a second pole above the gap layer, forming a layer of photoresist above the second pole, patterning the photoresist such that the photoresist covers areas of the gap layer positioned towards the second pole, removing exposed portions of the gap layer, removing part of exposed portions of the first pole for forming steps in the first pole on opposite sides of the photoresist, removing the photoresist, and milling for creating a shoulder of the first pole tapering upwardly towards the cap.

The structures formed by the above processes can be used to form write heads for use in a magnetic storage system.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
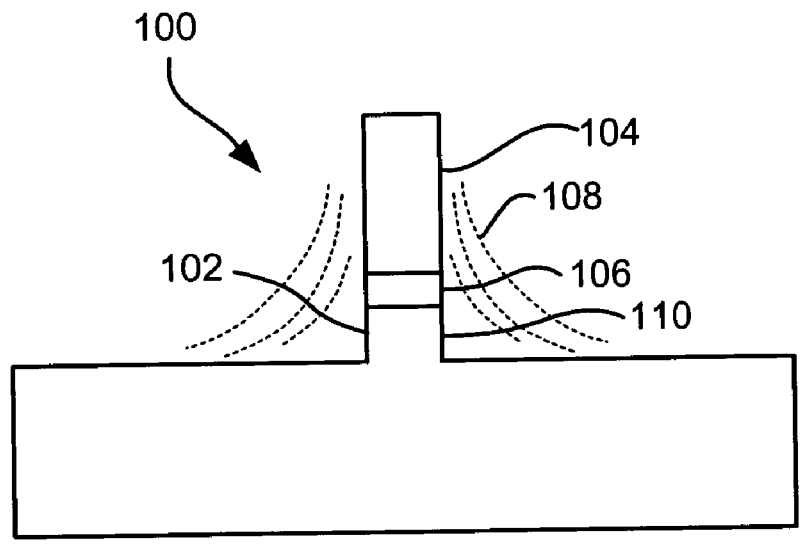
FIG. 1 is a partial ABS view, not to scale, of a typical inductive write head.
Figure 2:
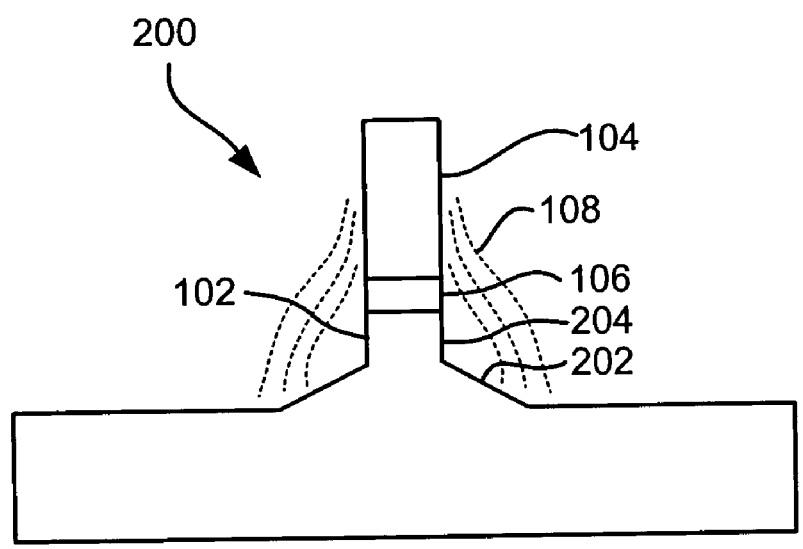
FIG. 2 is a partial ABS view, not to scale, of an inductive write head with a tapered shoulder.
Figure 3:
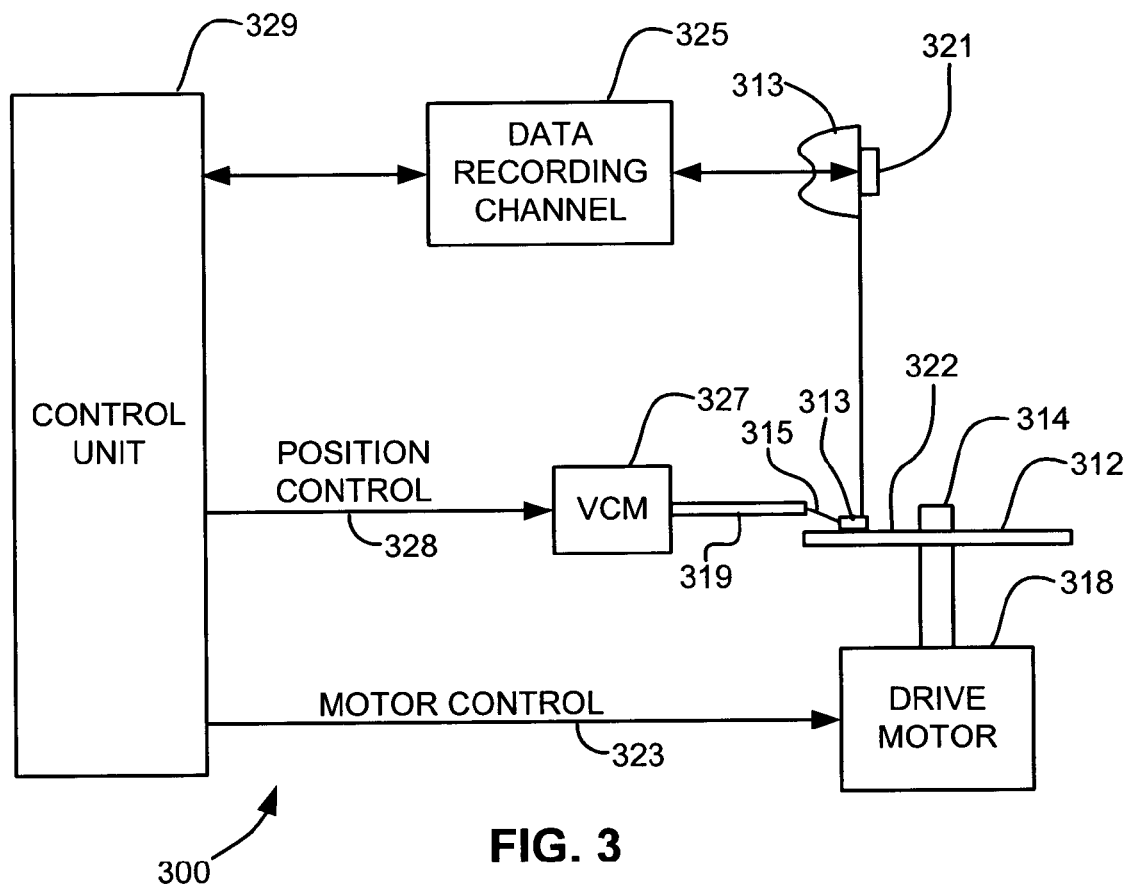
FIG. 3 is a perspective drawing of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk.

At least one slider 313 is positioned on the disk, each slider supporting one or more magnetic read/write heads 321. As the disks rotate, slider is moved radially in and out over disk surface 322 so that heads may access different tracks of the disk where desired data are recorded. Each slider is attached to an actuator arm 319 by way of a suspension 315. The suspension provides a slight spring force which biases slider against the disk surface. Each actuator arm is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk generates an air bearing between slider and disk surface which exerts an upward force or lift on the slider. The air bearing thus counter-balances the slight spring force of suspension and supports slider off and slightly above the disk surface by a small, substantially constant spacing during normal operation.

The various components of the disk storage system are controlled in operation by control signals generated by control unit, such as access control signals and internal clock signals. Typically, control unit comprises logic control circuits, storage means and a microprocessor. The control unit generates control signals to control various system operations such as drive motor control signals on line 323 and head position and seek control signals on line 328. The control signals on line 328 provide the desired current profiles to optimally move and position slider to the desired data track on disk. Read and write signals are communicated to and from read/write heads by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders. Further, it should be understood that the teachings found herein are equally applicable to the processing of any type of magnetic head, including tape heads.

As mentioned above, it would is desirable to form a shoulder tapering towards a notch on the first pole. The notch focuses the flux while the tapered shape minimizes fringing fields without affecting the flux. This design improves overwrite and minimizes leakage and adjacent track interference.

The invention provides different methods for forming the tapered shoulder. The invention uses a modified P1 cap process to achieve the desired notched shape with tapered shoulder without the need to introduce additional photo steps.

Figure 4:
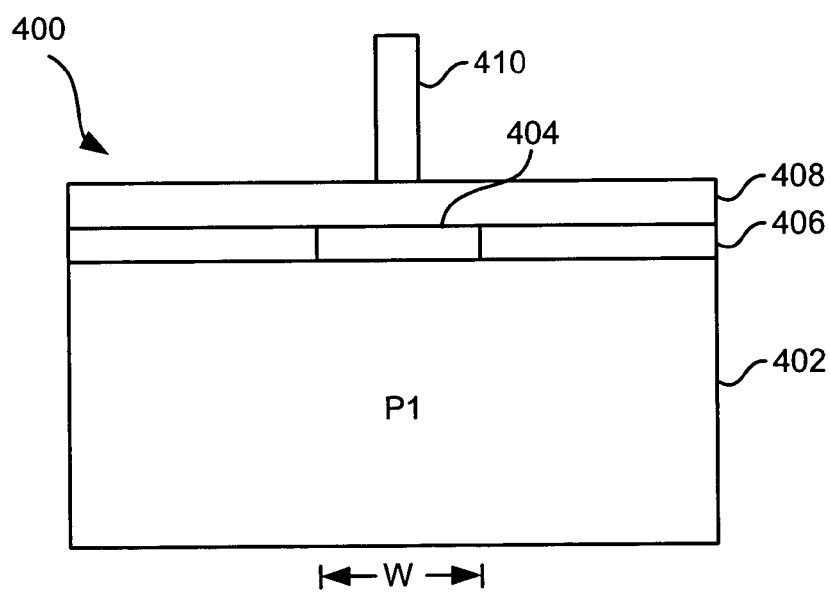
FIG. 4 is a partial ABS view, not to scale, of a structure to be processed into a write head.
Figure 5:
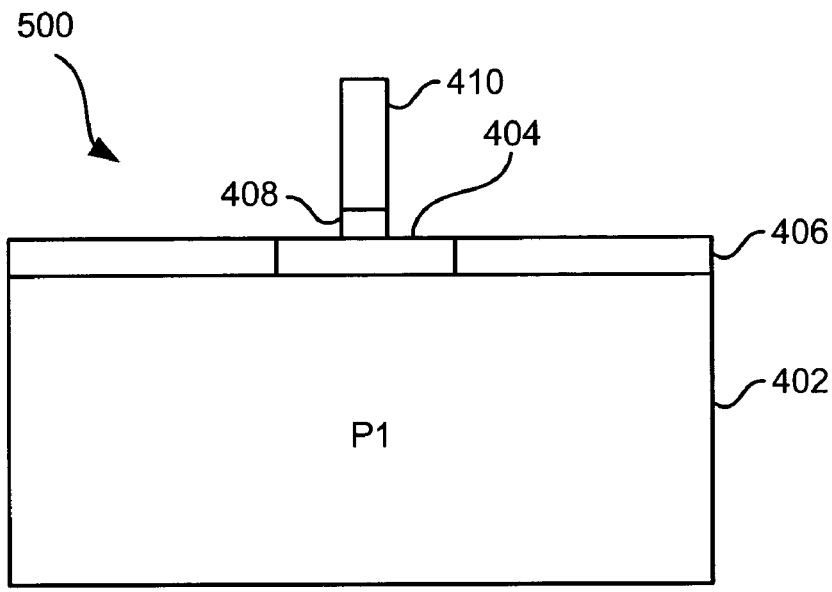
FIG. 5 is a partial ABS view of the structure of FIG. 4 upon milling to remove a gap layer.

FIGS. 4–7 depict formation of an inductive write head with a tapered shoulder according to one preferred embodiment. Referring to FIG. 4, a write head structure 400 has been partially formed. The structure 400 includes a first pole 402 (P1). A cap 404 of a high moment material is formed above the first pole 402. Because a high moment material is used, the cap 404 can function as an extension of the first pole 402. As shown in FIG. 4, the width W of the cap 404 is not as extensive as the width of the first pole 402. The cap 404 can be formed of the desired width, or the side regions of the cap 404 can be removed by processing. In the example shown, the width of the cap layer is reduced to, preferably, about 1–3 microns.

A layer of material 406 is formed in the empty side regions adjacent the cap 404. This layer can be fabricated in a single lithography step by first milling the pattern 404, then refilling with the desired material layer 406. Finally, a liftoff process assures the planarity of the structure. The preferred material for layer 406 is a dielectric such as alumina ($Al_2O_3$), silicon dioxide ($SiO_2$), etc. However, any material susceptible to reactive ion etching (RIE) or reactive ion milling may be used.

A metal gap layer 408 is formed above the cap 404 and layer 406, such as by deposition. The gap layer 408 is constructed of a nonmagnetic metal, so it can function as the write gap. A second pole 410 of a conventional material is formed above the metal gap layer 408, such as by plating.

Figure 6:
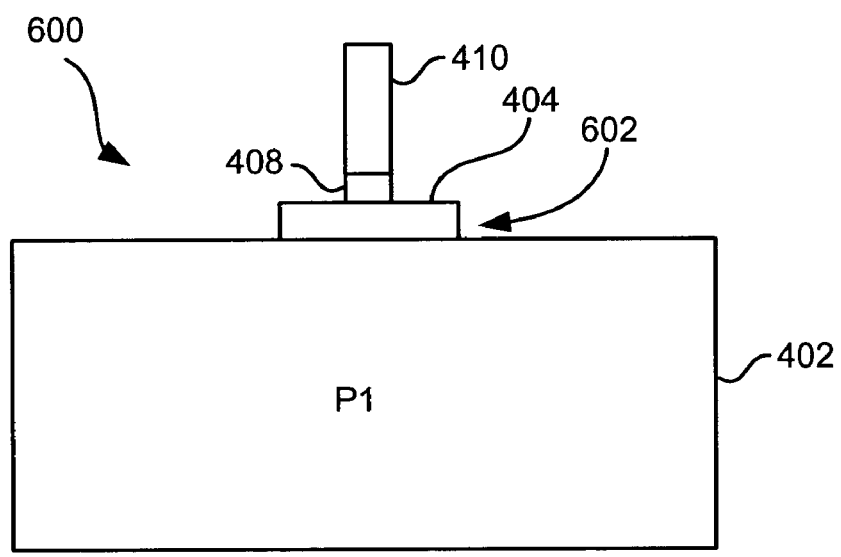
FIG. 6 is a partial ABS view of the structure of FIG. 5 upon milling to remove a fill layer.
Figure 7:
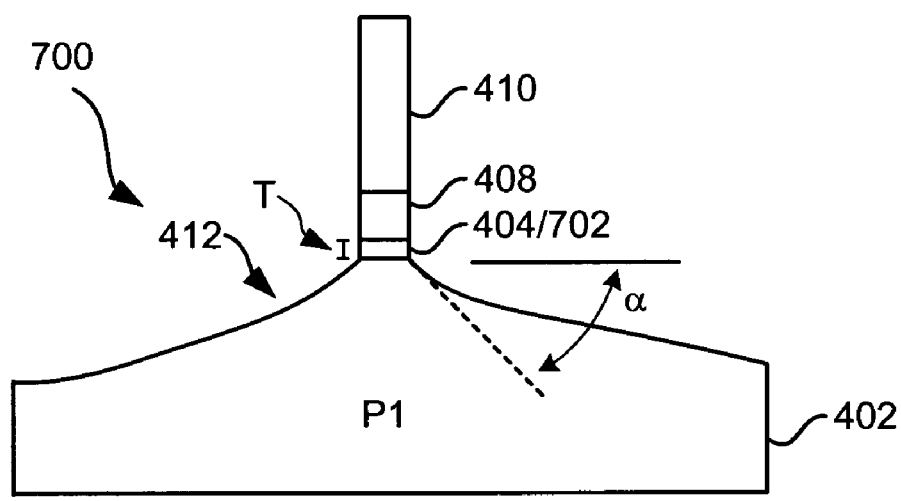
FIG. 7 is a partial ABS view of the structure of FIG. 6 upon milling to form a tapered shoulder of a first pole.

Then the structure 400 of FIG. 4 is processed. Exposed areas of the metal gap layer 408 are removed using ion milling such as argon milling to create the structure 500 shown in FIG. 5. As shown, the dielectric layer 406 is exposed. This structure 500 is then processed with a high selectivity process to remove the dielectric layer 406 creating a step on either side of the pole piece. The high selectivity process is used to minimize reduction of the second pole 410 as well as leaving the second pole 410 and cap 404 nearly intact. The preferred process to remove layer 406 is reactive ion milling if alumina is used, and RIE if silicon dioxide is used. The resulting structure 600 is shown in FIG. 6. The structure 600 of FIG. 6 is ion milled, preferably by argon milling, to remove the exposed areas of the cap 404, thereby forming the notch 602. The milling also reduces the first pole 402, thereby forming the desired "steep shoulder" effect. The tapered shape of the shoulder 412 is created because the cap 404 slows the milling of the first pole 402. Also, the shadowing effect of the second pole 410 works in conjunction with the angled and rotating milling to create the tapered shape. The final head 700 is shown in FIG. 7. The second pole 410 also is self-aligned with the notch, thereby eliminating the need to align the second pole 410 and notch. Note that some of the second pole 410 will be consumed by the milling (2–3 times as much as the first pole 402) since it sees 100% of the milling (P1 is shadowed), so this should be accounted for prior to performing this method.

This method provides the following advantages. It requires no additional photo layer. It requires only one additional process step (RIE or ion mill). It does not affect the track width and pole shape control.

The desired angle α of the taper depends on the thickness of the remaining cap 404, and is preferably between about 25 and 80 degrees from the horizontal as viewed from the ABS. This range shows improvement as opposed to a typical head having a flat first pole. The ideal angle α of the taper is about 60 degrees if the thickness T of the straight portion 702 of the notched shape 404 is 0.2 microns. The ideal angle α of the taper is about 45 degrees if the thickness T of the straight portion 702 of the notched shape 404 is 0.3 microns. Thus, the thicker the straight portion, the less taper angle is required to obtain improved performance. Note that these angles are provided by way of example only and are also applicable to the remaining illustrative structures described herein.

To illustrate the effect of the tapered shoulder, Table 1 shows the effect of tapering the first pole on the fringing field at the same overwrite. As shown, the fringing effect decreases as the taper angle increases.

TABLE 1

| At same overwrite, adjust current | 25 degree shoulder | 40 degree shoulder |
| --- | --- | --- |
| Fringing | −210 Oe | −260 Oe |
| Write current | 33 mAmp | 30 mAmp |

Table 2 illustrates the effect of tapering the first pole on the overwrite and fringing field at the same write current. As shown, the overwrite increases and the fringing effect decreases as the taper angle increases.

TABLE 2

| At 40 mAmp | 25 degree shoulder | 40 degree shoulder |
| --- | --- | --- |
| Overwrite | +1 db | +1.4 db |
| Fringing | −70 Oe | −80 Oe |

FIGS. 8–11 depict formation of an inductive write head with a tapered shoulder according to one preferred embodiment. This process is similar to that described above with respect to FIGS. 4–7, but an alumina gap is used.

Figure 8:
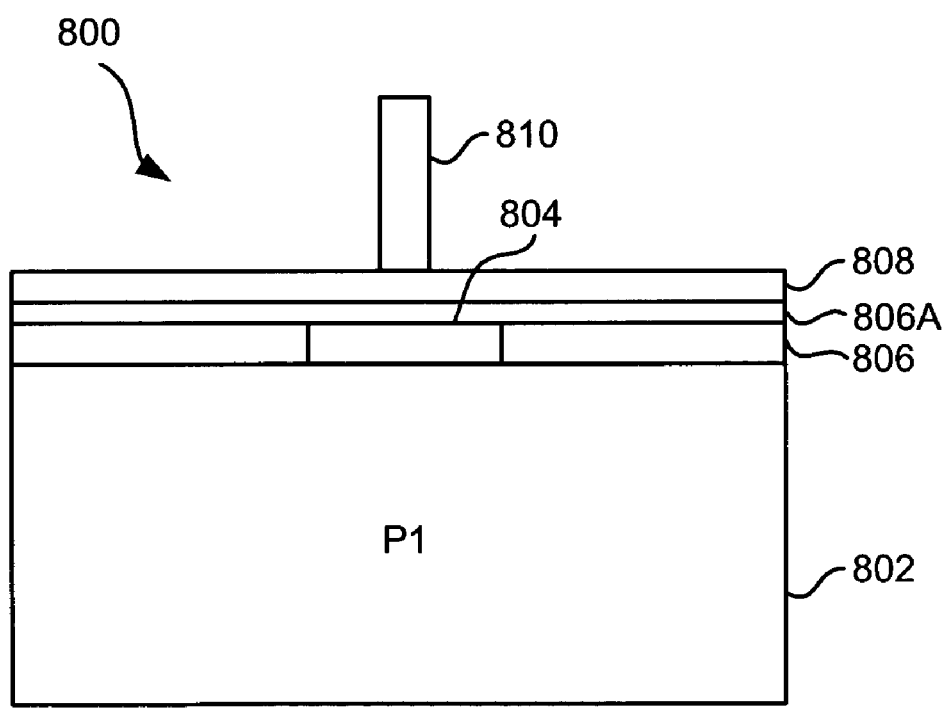
FIG. 8 is a partial ABS view of another structure to be processed into a write head.

Referring to FIG. 8, a write head structure 800 has been partially formed. The structure 800 includes a first pole 802 (P1). A cap 804 of a high moment material is formed above the first pole 802. Again, the width of the cap 804 is not as extensive as the width of the first pole 802. An alumina layer 806 is formed above and adjacent the cap 804, such as by deposition, and preferably in a two-step process. Note that the alumina layer 806 can instead be constructed of silicon dioxide. Preferably the alumina layer 806 is formed in a two-step process, with a first layer 806 being deposited above the first pole 802 and a second layer 806A above the second layer.

A high moment magnetic metal seed layer 808 is formed above alumina layer 806, such as by deposition. The seed layer 808 is constructed of a metal upon which the second pole 810 can be formed, such as by plating.

Figure 9:
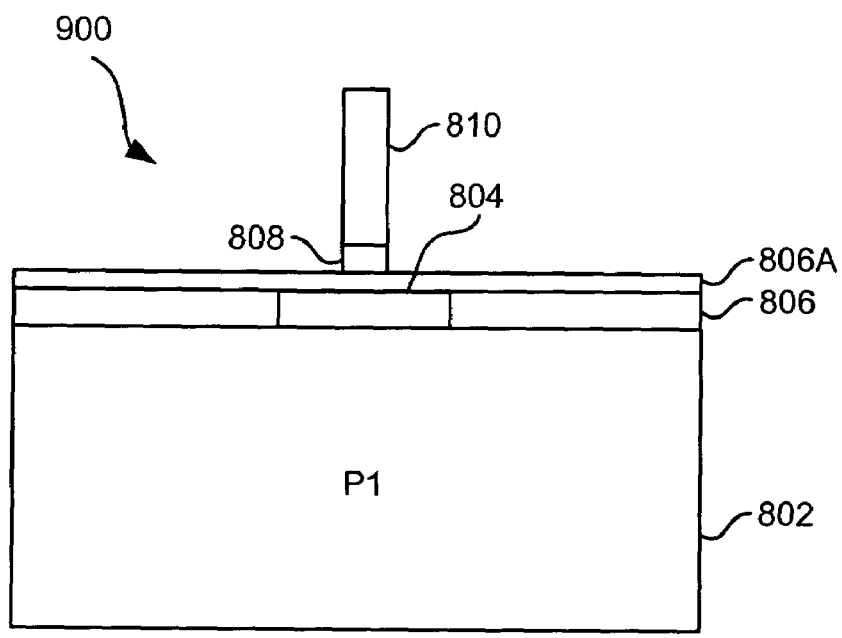
FIG. 9 is a partial ABS view of the structure of FIG. 8 upon milling to remove a gap layer.
Figure 10:
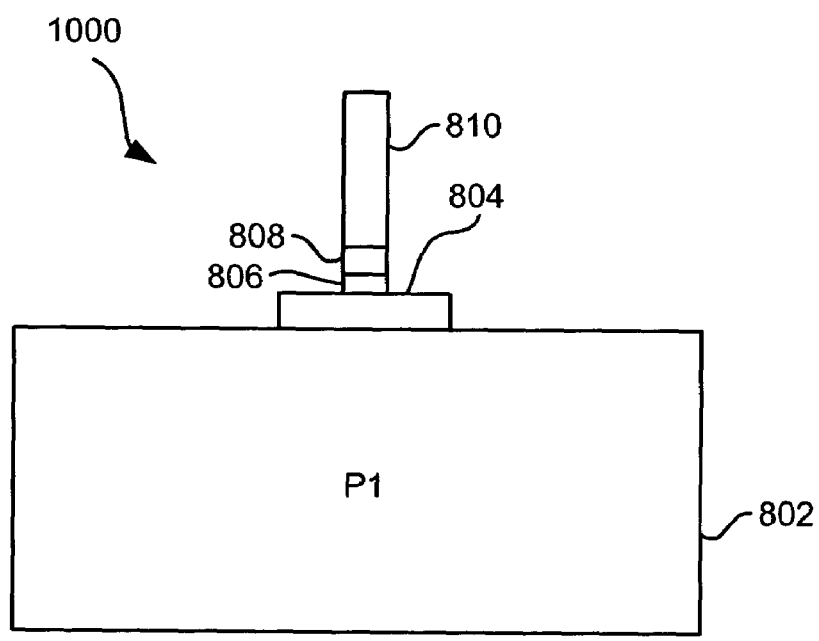
FIG. 10 is a partial ABS view of the structure of FIG. 9 upon milling to remove a dielectric layer.
Figure 11:
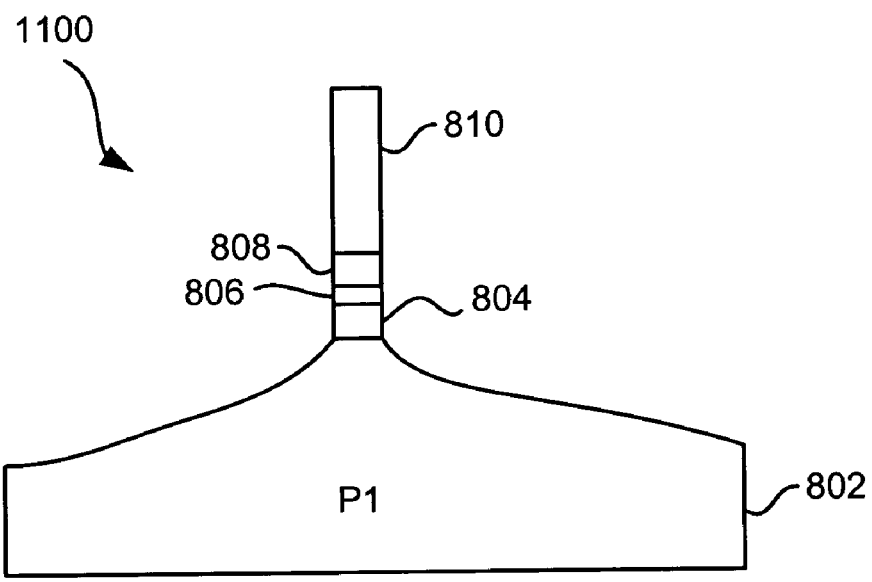
FIG. 11 is a partial ABS view of the structure of FIG. 10 upon milling to form a tapered shoulder of a first pole.

Referring to the structure 900 of FIG. 9, the exposed portions of the seed layer 808 is removed by Ar milling. Then the structure 900 of FIG. 9 is reactive ion milled to remove exposed portions of the gap layer 806, resulting in the structure 1000 shown in FIG. 10. The structure 1000 is milled once again, preferably by argon milling, to remove the exposed areas of the cap 804 and the first pole 802, thereby forming the notch. The resulting head 1100 is shown in FIG. 11.

FIGS. 12–16 depict formation of an inductive write head with a tapered shoulder according to one preferred embodiment. In this method, a photoresist mask is used to form the notch.

Figure 12:
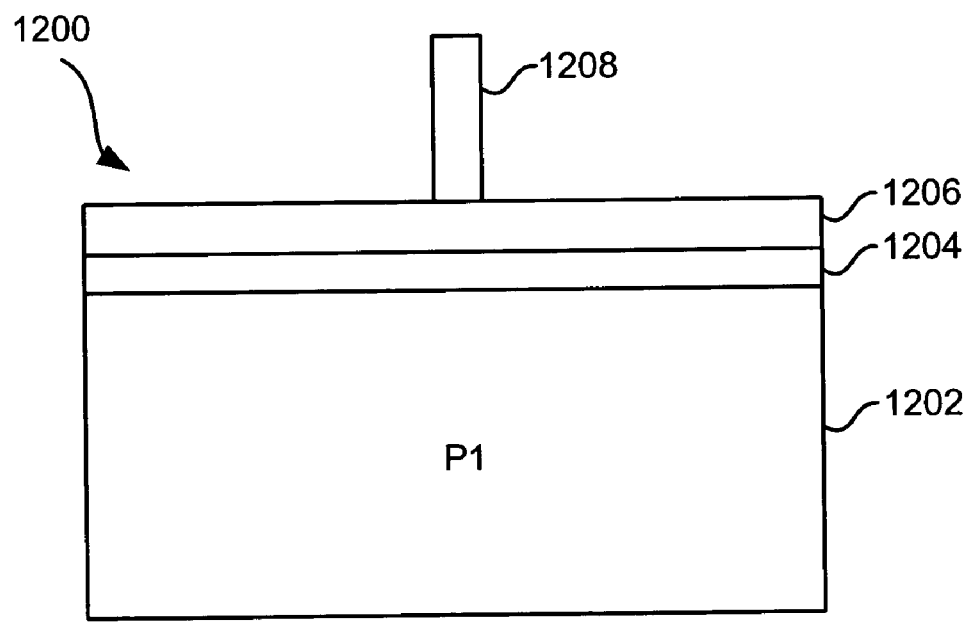
FIG. 12 is a partial ABS view of another structure to be processed into a write head.

The structure 1200 of FIG. 12 includes a first pole 1202, a dielectric or nonmagnetic metal gap layer 1204 is formed above the first pole 1202. A high moment seed layer 1206 is formed above the gap layer 1204. A second pole 1208 is formed above the seed layer 1206. Note that an optional layer of high moment magnetic material (not shown) can be formed between the first pole 1202 and the gap layer 1204.

Figure 13:
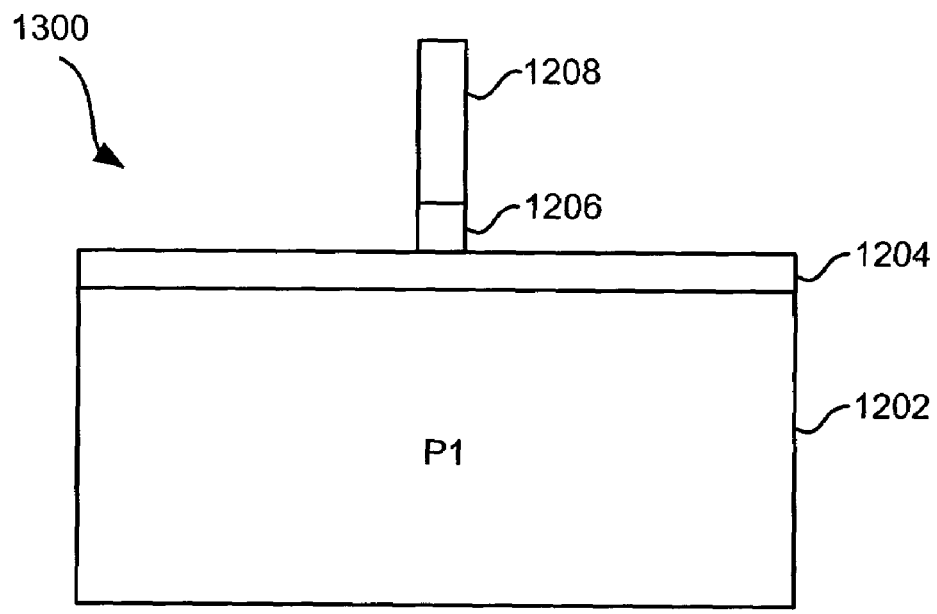
FIG. 13 is a partial ABS view of the structure of FIG. 12 upon milling to remove a seed layer.
Figure 14:
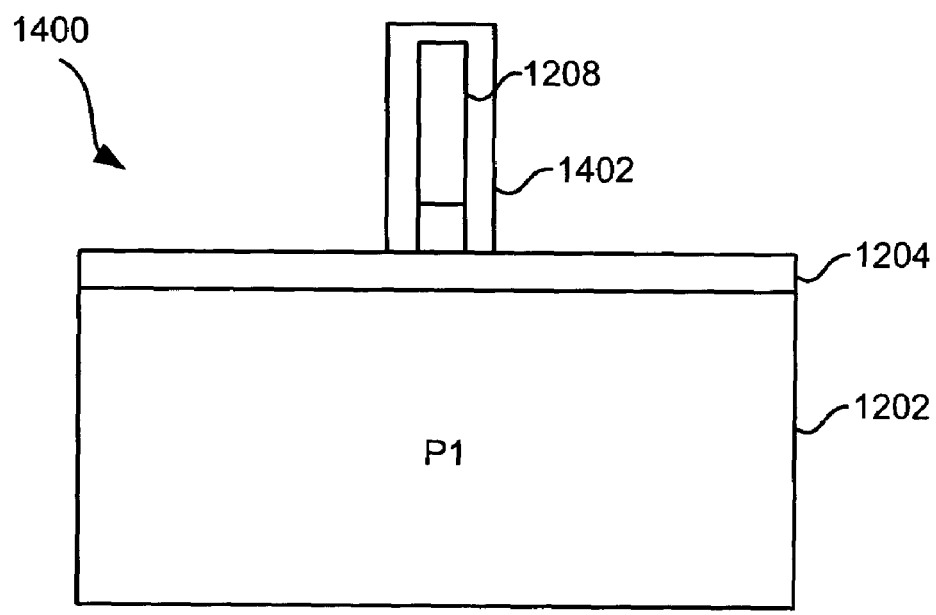
FIG. 14 is a partial ABS view of the structure of FIG. 13 upon addition of a photoresist mask.
Figure 15:
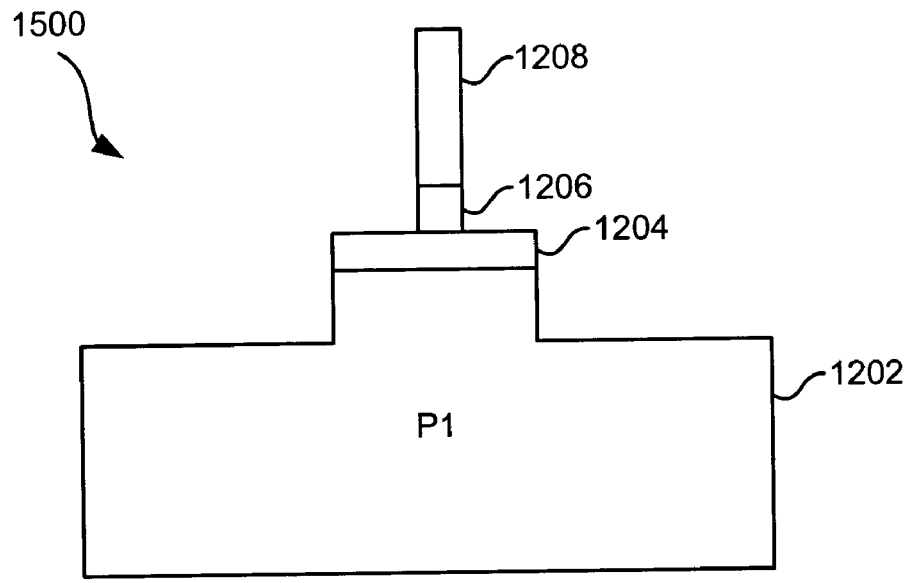
FIG. 15 is a partial ABS view of the structure of FIG. 14 upon milling to form a notch in a first pole.
Figure 16:
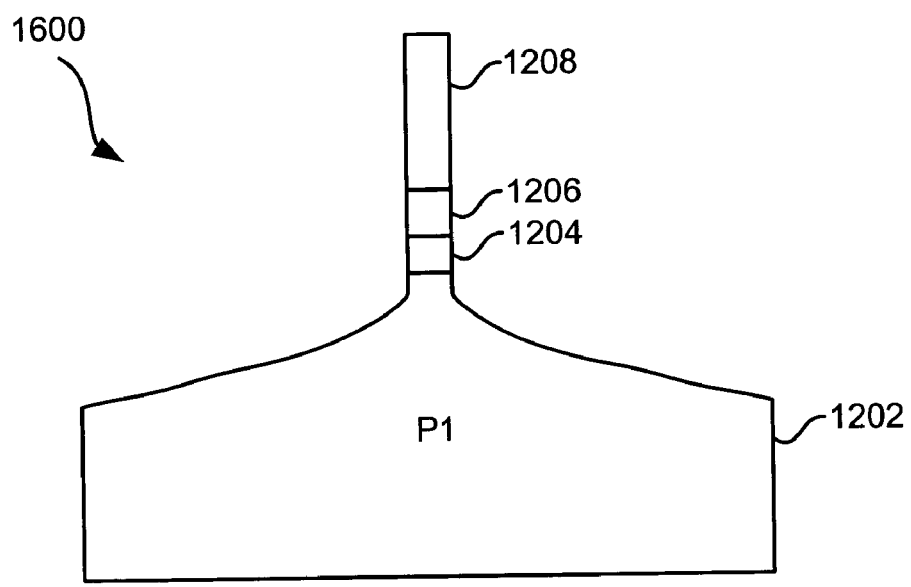
FIG. 16 is a partial ABS view of the structure of FIG. 15 upon milling to form a tapered shoulder of the first pole.

Exposed portions of the seed layer 1206 are removed by milling to create the structure 1300 shown in FIG. 13. Referring to the structure 1400 of FIG. 14, a layer of photoresist 1402 is added to the structure and patterned to form a mask over a portion of the gap layer 1204. The structure 1400 is reactive ion milled to remove exposed portions of the gap layer 1204. Further milling is performed to form the step in the first pole 1202. Then the photoresist 1402 is removed, leaving the structure 1500 shown in FIG. 15. The structure 1500 is milled again to form the notch and steep shoulder. FIG. 16 illustrates the final structure 1600.

Note that although ion milling has been described as a preferred method, any suitable milling process may be used using these generally concepts, as will be understood by one skilled in the art. Note also that the gap layers can be formed of anything that is nonmagnetic, i.e., a nonmagnetic metal or dielectric.

While various embodiments have been described above, it should be understood that they have been presented by way of example only, and not limitation. For example, the structures and methodologies presented herein are generic in their application to all inductive and perpendicular MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A method for fabricating a magnetic head, comprising: creating a structure, comprising: forming a first pole; forming a cap above the first pole, empty side regions being positioned laterally on opposite sides of the cap; filling the side regions with a fill material selected from a group consisting of a dielectric, a material susceptible to removal by reactive ion etching, and a material susceptible to removal by milling; thereafter forming a dielectric gap layer above the cap and the fill material; forming a second pole above the gap layer; and milling the structure for creating a shoulder of the first pole tapering upwardly towards the can.

2. The method as recited in claim 1, further comprising filling the side regions with a material selected from a group consisting of a dielectric, a material susceptible to removal by reactive ion etching, and a material susceptible to removal by milling.

3. The method as recited in claim 2, further comprising performing in sequence prior to milling the structure: removing exposed portions of the gap layer, and removing the material used to refill the side regions.

4. The method as recited in claim 1, wherein side edges of the second pole, gap layer, and cap are substantially vertically aligned.

5. The method as recited in claim 1, wherein the gap layer is alumina.

6. The method as recited in claim 1, wherein the gap layer is silicon dioxide.

7. The method as recited in claim 1, wherein the gap layer is nonmagnetic metal.

8. The method as recited in claim 1, further comprising forming a seed layer above the gap layer, the second pole being plated on the seed layer.

9. The method as recited in claim 1, wherein the structure is ion milled.

10. A method for fabricating a magnetic head, comprising: forming a first pole; forming a cap above the first pole, removing opposite side regions of the cap; refilling the side regions with a fill material selected from a group consisting of a dielectric, a material susceptible to removal by reactive ion etching and a material susceptible to removal by milling; forming a gap layer above the cap independently of the refilling the side regions; forming a second pole above the gap layer; removing exposed portions of the gap layer; removing the material used to refill the side regions, thereby exposing peripheral regions of the cap; and milling the cap and first pole for creating a shoulder of the first pole tapered upwardly towards the cap; wherein side edges of the second pole, gap layer, and cap are substantially vertically aligned after the milling.

11. The method as recited in claim 10, wherein the exposed portions of the gap layer are removed by reactive ion etching.

12. The method as recited in claim 10, wherein the gap layer is a dielectric.

13. The method as recited in claim 10, wherein the gap layer is nonmagnetic metal.

* * * * *

UNITED STATES PATENT AND TRADEMARK OFFICE
CERTIFICATE OF CORRECTION

| | | |
|---|---|---|
| PATENT NO. | : 7,083,738 B2 | Page 1 of 1 |
| APPLICATION NO. | : 10/632631 | |
| DATED | : August 1, 2006 | |
| INVENTOR(S) | : Lee et al. | |

It is certified that error appears in the above-identified patent and that said Letters Patent is hereby corrected as shown below:

In the claims:
col. 6, line 65 change "towards the can" to --towards the cap--.

Signed and Sealed this

Fifth Day of December, 2006

JON W. DUDAS
*Director of the United States Patent and Trademark Office*